(12) United States Patent
Yokota

(10) Patent No.: US 7,325,242 B2
(45) Date of Patent: Jan. 29, 2008

(54) DISK APPARATUS

(75) Inventor: Kazuo Yokota, Tokyo (JP)

(73) Assignee: Teac Corporation, Tokyo (JP)

( * ) Notice: Subject to any disclaimer, the term of this patent is extended or adjusted under 35 U.S.C. 154(b) by 379 days.

(21) Appl. No.: 10/816,219

(22) Filed: Apr. 1, 2004

(65) Prior Publication Data

US 2004/0223420 A1 Nov. 11, 2004

(30) Foreign Application Priority Data

Apr. 2, 2003 (JP) ............................. 2003-099481

(51) Int. Cl.
*G11B 33/02* (2006.01)
*G11B 17/04* (2006.01)
(52) U.S. Cl. ...................... 720/609; 720/636
(58) Field of Classification Search ............... 720/619, 720/601, 636, 609, 637, 638; 369/30.36; 360/99.02, 99.06
See application file for complete search history.

(56) References Cited

U.S. PATENT DOCUMENTS

| | | | |
|---|---|---|---|
| RE36,511 E * | 1/2000 | Liou et al. ................... | 720/609 |
| 6,208,606 B1 * | 3/2001 | Saito .......................... | 720/609 |
| 6,266,311 B1 * | 7/2001 | Song et al. .................. | 720/609 |
| 6,275,459 B1 * | 8/2001 | Obata et al. ................. | 720/636 |
| 6,625,098 B1 * | 9/2003 | Minase et al. .............. | 369/53.2 |
| 6,654,334 B1 * | 11/2003 | Yamashita et al. .......... | 720/641 |
| 2002/0018426 A1 * | 2/2002 | Minase ...................... | 369/75.2 |
| 2003/0002421 A1 * | 1/2003 | Ming-Hui et al. ......... | 369/77.1 |
| 2004/0165487 A1 * | 8/2004 | Liao et al. ................ | 369/30.36 |

FOREIGN PATENT DOCUMENTS

JP 2003-296997 10/2003

* cited by examiner

*Primary Examiner*—Brian E. Miller
*Assistant Examiner*—Matthew G. Kayrish
(74) *Attorney, Agent, or Firm*—Weingarten, Schurgin, Gagnebin & Lebovici LLP

(57) ABSTRACT

It is an object of the present invention to provide a disk apparatus having a function of externally the forcible unloading manipulation of an optical disk, and for enabling the forcible unloading manipulation only on the basis of clear recognition that a user intentionally performed the unloading of the optical disk, the disk apparatus enforcing such recognition. In the disk apparatus for loading and driving an optical disk, and for recording or reproduction of data on the optical disk, the disk apparatus comprises first release means and second release means for a mechanism for unloading a loaded optical disk to be manipulated externally, wherein manipulation of the second release means forcibly unloads the loaded optical disk by manipulation of the first release means.

5 Claims, 15 Drawing Sheets

DISK APPARATUS

This application claims priority to a Japanese patent application No. 2003-099481 filed Apr. 2, 2003.

BACKGROUND OF THE INVENTION

1. Field of the Invention

The present invention relates to a disk apparatus for driving optical disks (for example, a CD-R/RW, a DVD-R/RW/RAM/+R/+RW, etc.), which are recording media for recording a large amount of data used in various computer systems.

2. Description of the Related Art

In general, in order to record data on optical disks or to reproduce data from the optical disks, disk apparatuses for driving the optical disks are indispensable for personal computers (hereinafter, referred to as PCs), so that the disk apparatuses should be built into the main bodies of PCs or externally connected to the PCs through cables.

FIG. 13 shows an appearance of a notebook PC having a built-in disk apparatus. Here, a disk apparatus 101 is usually built into a side portion of the main body of a PC, a bezel 103 of a disk tray 102 is popped out by means of manipulation of a switch or instructions from the main body of the PC, and the user of the PC ejects the disk tray 102 to load an optical disk D therein.

FIG. 14 shows an appearance of the conventional disk apparatus 101, and FIG. 15 shows an internal configuration of the disk tray 102 of the disk apparatus 101. Here, the disk tray 102 has a plate shape for receiving the optical disk D, and the center thereof is provided with a turntable 105 fixed to a driving shaft of a spindle motor 104 provided immediately therebelow. A central hole of the optical disk is clamped by a clamp head 106 of the turntable 105, thereby transferring turning force to the optical disk.

Reference numeral 107 denotes a head unit. Here, the entire head unit is reciprocated in a diametrical direction of the disk tray 102 by means of a driving mechanism 108 provided at the other surface of the disk tray 102, and a laser beam is applied from an objective lens 107a to the optical disk. In addition, the front end of the disk tray 102 is provided with a bezel 103 for decorating the external appearance thereof. The external surface of the bezel 103 is provided with an indicator window 110 and a push-button 109 for releasing a loaded state of the disk tray 102, and a through hole 103a for inserting an emergency pin P is formed on the surface of the bezel 103 in order to forcibly release the locked state of the disk tray 102.

On both sides of the disk tray 102 thus constructed are loosely fitted by guide rails 111, and the guide rails 111 are slidably supported by support rails fixed to a chassis case 112. Accordingly, the disk tray 102 is moved forwardly and backwardly in the chassis case 112, thereby enabling the loading and the unloading of the optical disk.

Further, an ejection and lock mechanism 113 is provided, which keeps the disk tray 102, that is, locks the disk tray, in a state in which the disk tray 102 is loaded and stopped at a prescribed position in the chassis case 112, and which releases the locked state, that is, ejects the disk tray 102. The disk tray 102 is locked by means of the ejection and lock mechanism 113, using engaging a lock lever 114 with a lock pin 115 fixed to the chassis case 112, while the locked state is released, that is, the disk tray 102 is ejected in a normal operation by means of the driving of a self-holding solenoid 116 (for example, see Patent Document 1).

[Patent Document 1]
Japanese Patent Application No. 2002-97076

In a case where the disk apparatus 101 thus constructed is built into the main body of the PC, in order to unload the disk tray 102, the ejection and lock mechanism 113 works, as described above, by means of instructions from the PC or manipulation of the push-button 109 by a user, thereby releasing the locked state, that is, ejecting the disk tray 102.

On the other hand, in a rare, disordered state, the PC may not recognize the optical disk when the optical disk is loaded into the disk apparatus. In this situation, the disk tray cannot be unloaded even by means of manipulation of the push-button by a user, so that the optical disk loaded into the disk tray cannot be recovered. Since this disadvantage may also occur due to a disorder of a mechanical system of the disk tray, measures for coping with such emergencies are taken.

According to such measures, the locked state of the disk tray may be forcibly released externally, as described above. That is, the engagement of lock lever 114 with the lock pin 115 is released, as shown in FIG. 15, by inserting the emergency pin P into the through hole 103a formed in the bezel 103, thus moving the lock lever 114 inversely.

A function for avoiding an abnormal state by means of the external forcible manipulation is necessary for such a disk apparatus. However, in coping with the emergency thus, if recorded data is being reproduced during the driving of the optical disk, the recorded data is not destroyed. However, when data is being recorded onto the optical disk, the recording may not be completed, or the recorded data may be destroyed.

Since the ejection and lock mechanism constructed as described above works even in cases of careless manipulation of the pin, the ejection and lock mechanism always has the danger described above. Further, since the ejection and lock mechanism may be manipulated, for example, by accident or carelessness by a user, it is required that such danger be avoided in advance.

SUMMARY OF THE INVENTION

Accordingly, it is an object of the present invention to provide a disk apparatus having a function of the external, forcible unloading manipulation of an optical disk, and of enabling the forcible unloading manipulation only on the basis of clear recognition that a user intends to perform the unloading of the optical disk, and a disk apparatus capable of enforcing such recognition.

Therefore, in order to accomplish the above object, the present invention provides the following means. That is, according to a first aspect of the present invention, there is provided a disk apparatus for loading and driving an optical disk, and for recording or reproduction of data on the optical disk, wherein the disk apparatus comprising first release means and second release means for externally manipulating a mechanism for unloading a loaded optical disk, wherein manipulation of the second release means for forcibly unloading a loaded optical disk by manipulation of the first release means.

According to a second aspect of the present invention, there is provided a disk apparatus according to the first aspect, wherein the driving of a spindle motor for rotating the optical disk is stopped by the manipulation of the first release means.

According to a third aspect of the present invention, there is provided a slot-in type disk apparatus for loading and driving an optical disk, and for recording or reproduction of data on the optical disk, wherein the disk apparatus comprising: a loading gear unit for loading and unloading the optical disk; a rack gear unit for interlocking with the loading gear unit; first release means for loading gear unit being manipulatable externally; and second release means for rack gear unit being manipulatable externally, wherein a manipulation-protected state of the rack gear unit is released by manipulation of the loading gear unit.

According to a fourth aspect of the present invention, there is provided a disk apparatus according to the third aspect, wherein the rack gear unit switches to a floating state to enable the unloading manipulation of the optical disk by the manipulation of the loading gear unit.

According to a fifth aspect of the present invention, there is provided a disk apparatus for loading and driving an optical disk, and for recording or reproduction of data on the optical disk, wherein the disk apparatus comprising: first release means and second release means for externally manipulating through an emergency through hole provided in an apparatus casing; and an emergency unloading mechanism for stopping driving of a spindle motor for rotating the optical disk by manipulation of the first release means, and for unloading forcibly a loaded optical disk by manipulation of the second release means.

BRIEF DESCRIPTION OF THE DRAWINGS

The above and other features and advantages of the present invention will become more apparent from detailed description of exemplary embodiments thereof with reference to the accompanying drawings in which.

DESCRIPTION OF THE PREFERRED EMBODIMENT

Now, preferred embodiments in which the present invention is applied to a slot-in type disk apparatus will be described in detail with reference to the accompanying drawings.

Figure 1:
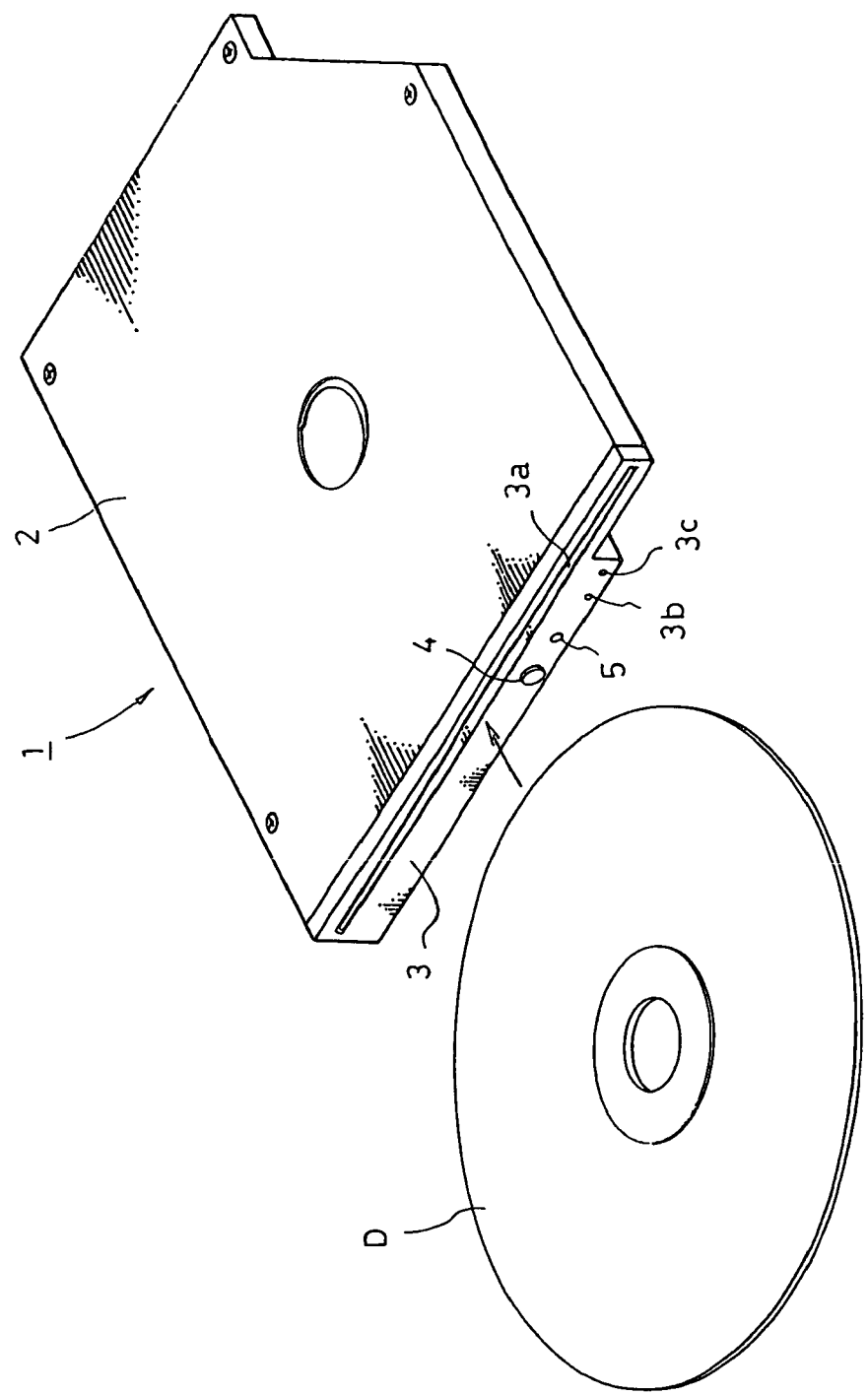
FIG. 1 is a perspective view illustrating an appearance of a disk apparatus according to an embodiment of the present invention.

FIG. 1 is a perspective view illustrating an appearance of a disk apparatus 1 according to the present invention, where a bezel 3 is fixed to an opening portion at the front end of a chassis case 2 formed in a sealed state. A slot 3a into which an optical disk D is inserted, and through holes 3b and 3c for emergency release are formed in the bezel 3. Further, the bezel 3 comprises a push-button 4 for instructing the external unloading of the received optical disk D and an indicator 5 for displaying the operational condition of the disk apparatus 1.

Figure 2:
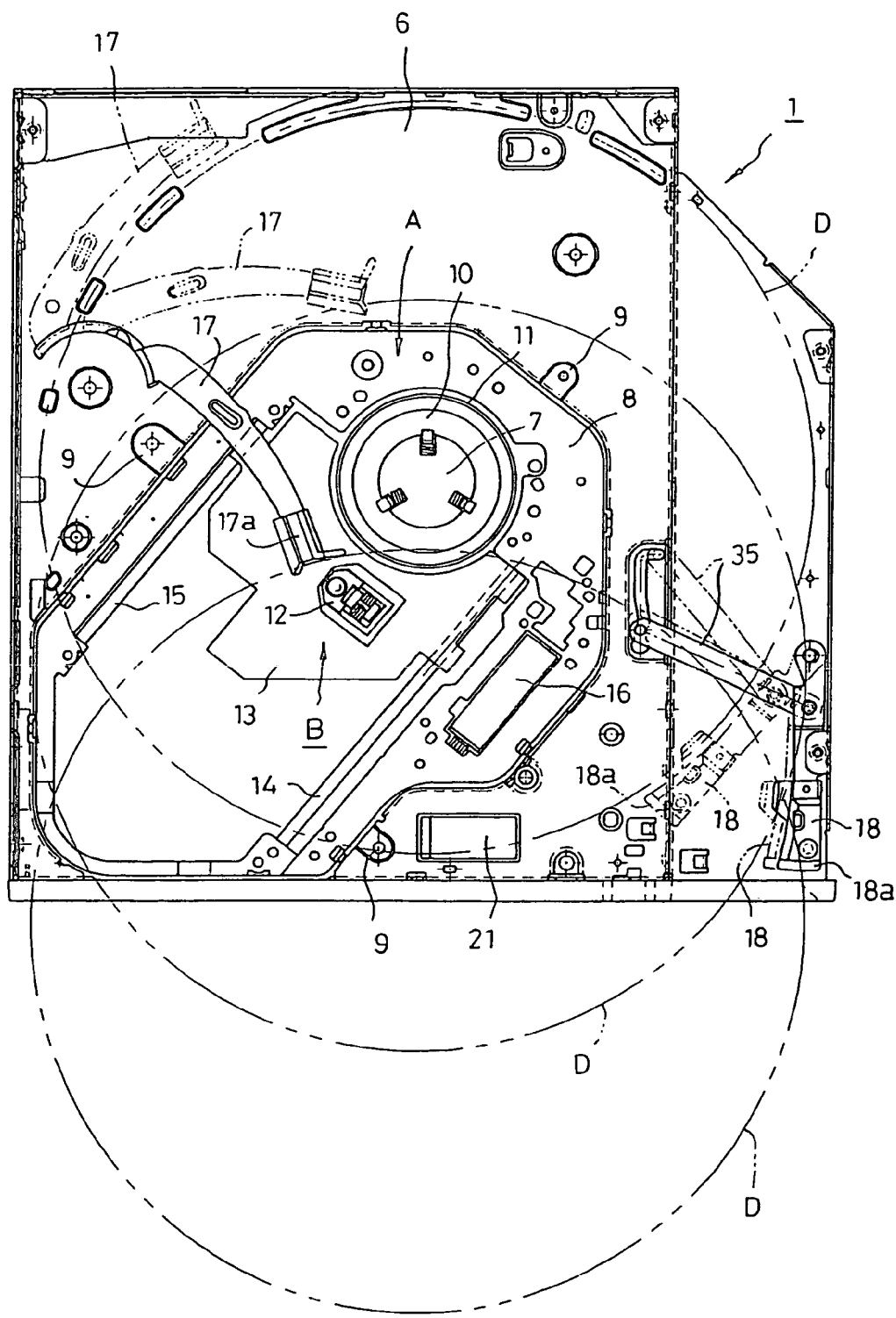
FIG. 2 is a plan view illustrating an inner configuration of the disk apparatus shown in FIG. 1.
Figure 3:
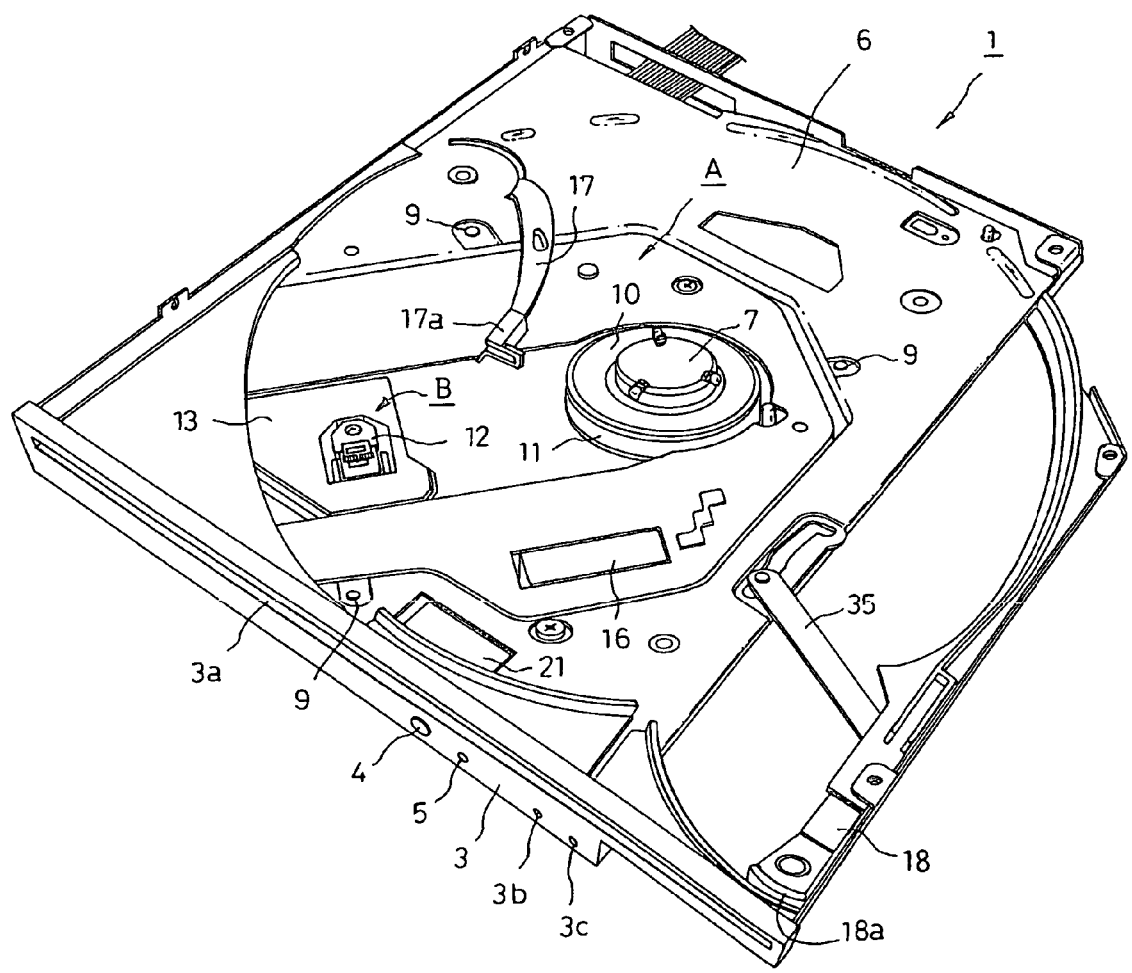
FIG. 3 is a perspective view illustrating an inner configuration of the disk apparatus shown in FIG. 1.

FIG. 2 is a plan view illustrating a state in which the top portion of the disk apparatus 1 is removed, and FIG. 3 is a perspective view illustrating the state. In the figures, a base panel 6 is provided in the chassis case 2, and a driving system unit A for the optical disk D is provided in a direction inclined from the center of the base panel 6. In this driving system unit A, in order to clamp a central hole of the optical disk D, or to release the clamped state of the central hole when the optical disk D is loaded into or unloaded from the chassis case 2, a frame member 8, capable of being moved up and down, is connected to the base panel 6 through a plurality of buffing support structures 9.

At the front end of the frame member 8, a clamp head 7 is provided at a position corresponding to the center of the optical disk that is loaded and stopped. The clamp head 7 is integrally constructed with a turntable 10, and fixed to a driving shaft of a spindle motor 11 provided immediately below the turntable 10, so that the optical disk D clamped by the clamp head 7 is rotationally driven by means of the spindle motor 11.

Next, reference numeral B denotes a head unit, which is fixed to a carrier block 13 for reciprocating an optical pickup device 12 in a diametrical direction of the optical disk D. The carrier block 13 is supported by both guide shafts 14 and 15 and is reciprocated by means of a sled motor 16 and a gear unit (not shown).

Reference numeral 17 denotes an ejecting lever for ejecting the optical disk D externally from the chassis case 2, and reference numeral 18 denotes a guide lever for guiding the entering optical disk D into the chassis case 2. The front ends 17a and 18a of the ejecting lever 17 and the guide lever 18 are differentially moved by means of a link mechanism 19 shown in FIG. 4, so that the optical disk D is automatically guided into the chassis case 2.

That is, as shown in FIG. 2, when the optical disk D is inserted through the slot 3a of the bezel 3, the front end of the optical disk D first comes into contact with the front end 17a of the ejecting lever 17. Then, when the optical disk D is inserted, the front end 17a of the ejecting lever 17 moves backwardly. At the same time, a limit switch 20 shown in FIG. 4 works, and, on the basis of a signal of the limit switch, a carrying mechanism C of the optical disk D begins driving.

Figure 5:
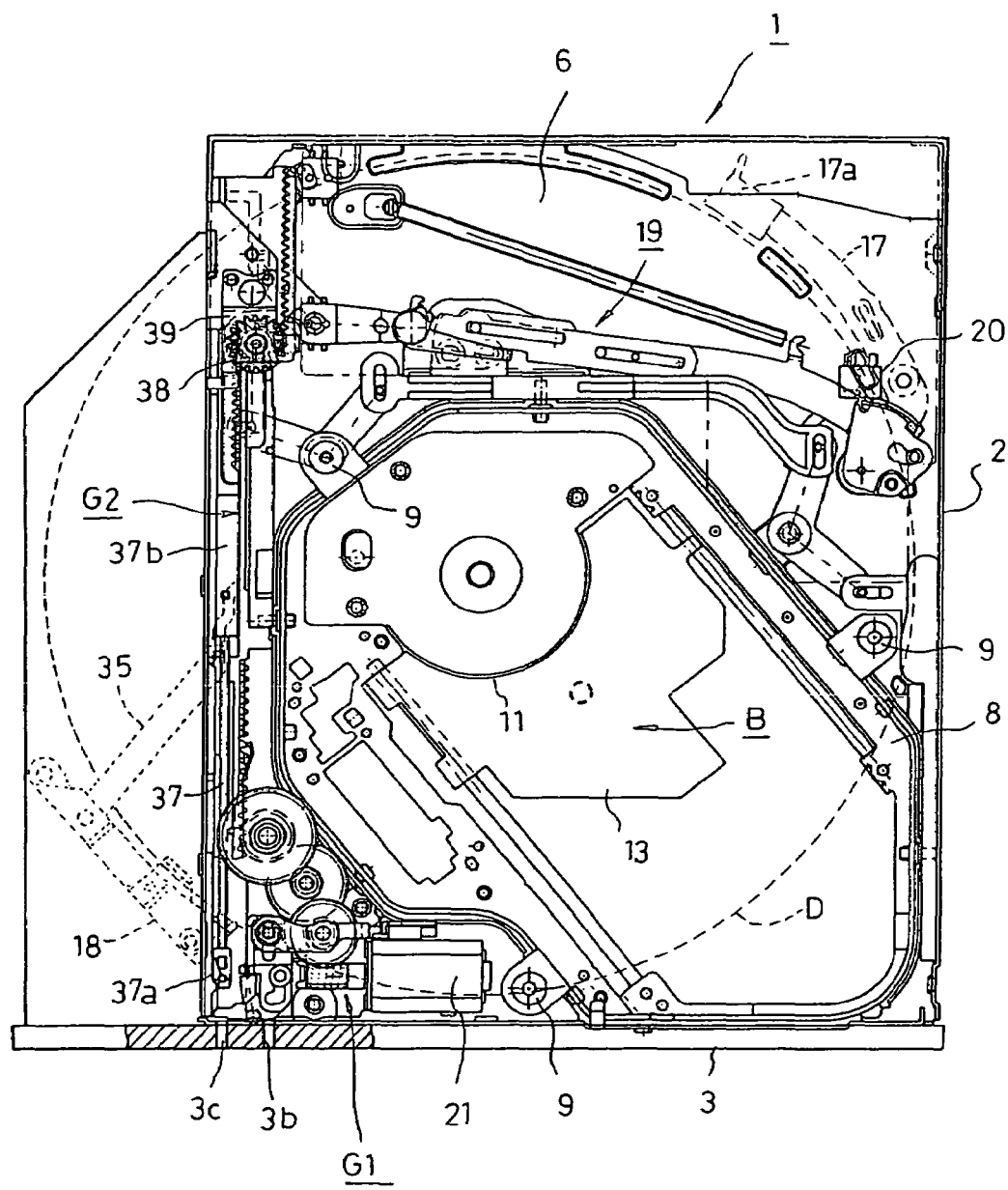
FIG. 5 is a diagram illustrating an operational state of the disk apparatus shown in FIG. 1.

In this state, the guide lever 18 is moved by means of operation of the carrying mechanism C, and thus the front end 18a thereof comes into contact with the rear end of the optical disk D, so that the optical disk D is guided into the chassis case 2. Then, as shown in FIG. 5, the optical disk D stops at a position where the central hole of the optical disk D matches with the clamp head 7, and the central hole of the optical disk D is clamped by the clamp head 7 by means of the up and down movement of the clamp head 7.

On the other hand, when the optical disk D guided into the chassis case 2 thus is ejected outwardly, the carrying mechanism C is driven in a driving direction opposite to the inserting direction of the optical disk in accordance with manipulation of the push-button 4 of the bezel 3 or instructions from the PC. Accordingly, the ejecting lever 17 is moved to carry the optical disk D from the front end 17a of the ejecting lever 17 to a position shown in FIG. 4.

Figure 6:
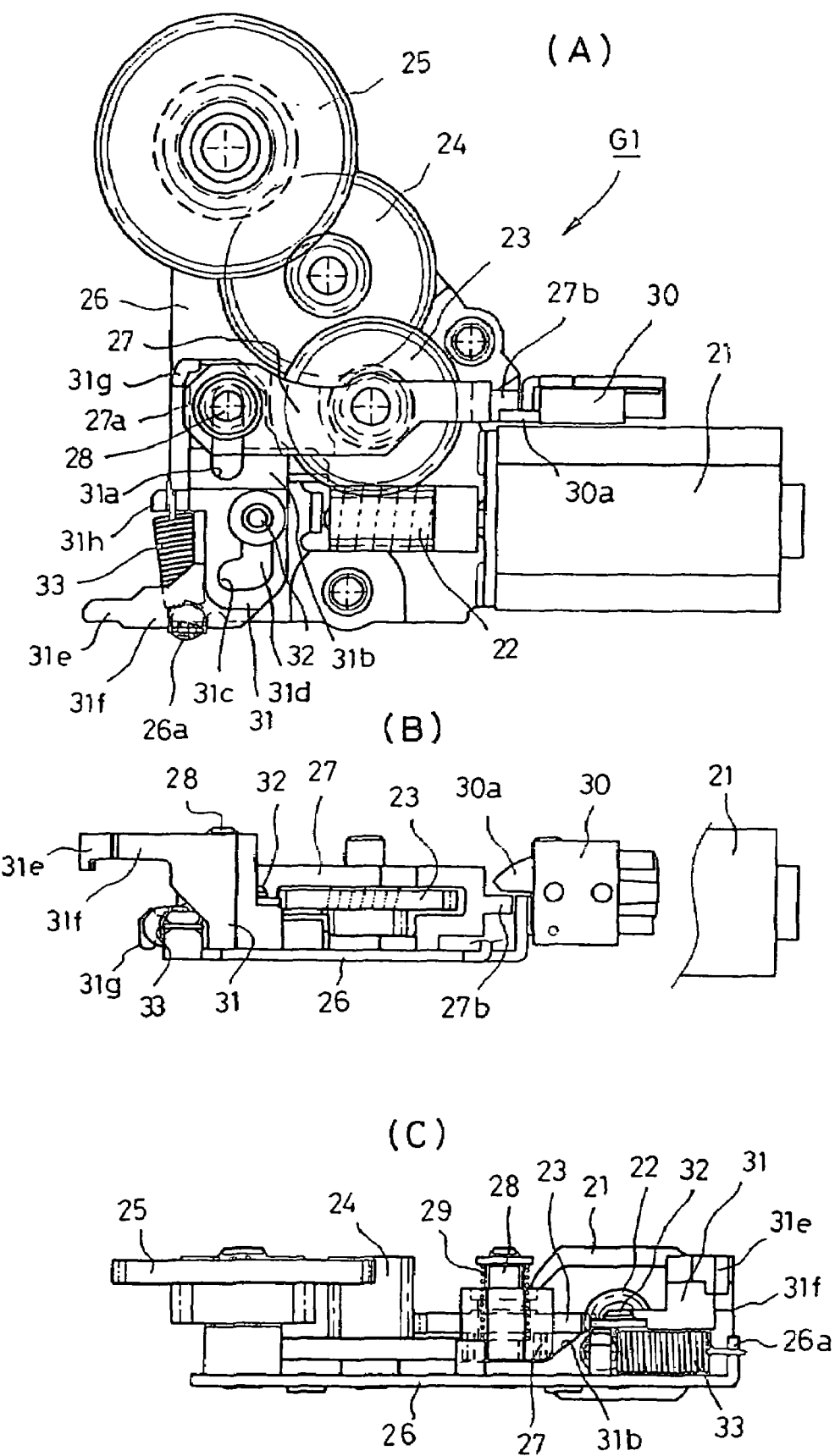
FIG. 6 is a diagram illustrating a loading gear unit.
Figure 7:
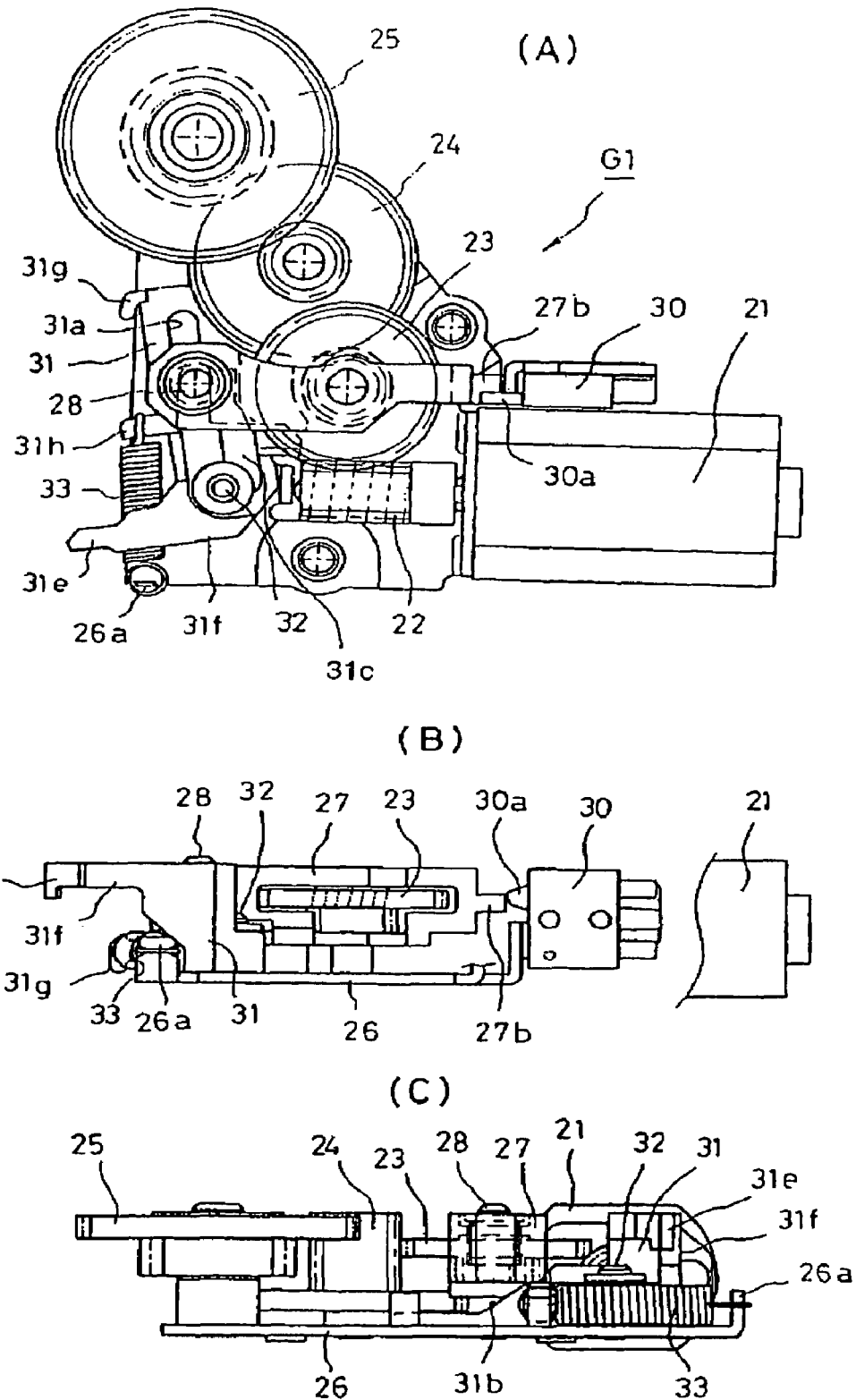
FIG. 7 is a diagram illustrating an operational state of the loading gear unit.

Next, the configuration of the carrying mechanism C for inserting and ejecting the optical disk D through the aforementioned automatic manipulation will be described. The carrying mechanism C is largely constructed by means of a combination of a loading gear unit G1 and a rack gear unit G2. FIGS. 6 and 7 are diagrams illustrating configurations and operational aspects of the loading gear unit G1. In the figures, reference numeral 21 denotes a loading motor that is a power source for the automatic manipulation, and a worm gear 22 is fixed to an output shaft of the loading gear 21 to be rotated coaxially with the loading motor. The rotary power of the worm gear 22 is transferred sequentially to double gears 23, 24 and 25 axially supported by the gear base 26, that is, from a small-diameter gear to a large-diameter gear, with a decrease in speed.

In this gear construction, the double gear 23 has a release mechanism for releasing engagement with the worm gear 22. A pivotal support pin 28 is inserted into an end portion 27a of a holder 27 for holding the double gear 23 and sliding up and down, and the end portion 27a is biased downwardly and supported axially by means of a compression coil spring 29, whereby in a normal state, as shown in FIG. 6(C), the worm gear 22 and the double gear 23 engage normally with each other. Furthermore, a dog head 27b is formed at the other end portion of the holder 27 on the loading motor 21 side, so that a knob 30a of the limit switch 30 fixed to the gear base 26 can be operated.

A lower surface of the end portion 27a of the holder 27 is provided with a slider member 31 supported coaxially with the pivotal support pin 28. A longitudinal groove 31a is formed at a portion of the slider member 31 axially supported by the pivotal support pin 28, so that the slider member 31 can slide in a direction perpendicular to the end portion 27a of the holder 27. A slant surface 31b is formed between the front end and the rear end of the slider member 31. Therefore, when the slider member 31 is moved forwardly, the slant surface 31b pushes the end portion 27a of the holder 27 from the bottom surface, thereby raising the entire holder 27.

A longitudinal groove 31d having an engaging step portion 31c to be axially supported by the pivotal support pin 32 is formed at the rear end of the slider member 31, and an operational piece 31f having a closing projection 31e is also formed at the rear end. On the other hand, a reset piece 31g to be started on the basis of movement of the rack gear unit G2 is formed at the front end portion of the slider member 31.

A tension coil spring 33 is provided with a tilt angle between a hook piece 31h of the slider member 31 constructed thus integrally and a hook piece 26a of the gear base 26, so that the slider member 31 is biased to be moved backwardly and be rotated counterclockwise.

Since the slider member 31 is formed as described above, the slider member 31 uses the pivotal support pin 28 as a supporting point in a normal state shown in FIG. 6. In this state, when the slide member 31 is pushed and advanced from its rear end portion and the engaging step portion 31c of the longitudinal groove 31d reaches the position of the pivotal support pin 32, the slider member 31 is rotated about the pivotal support pin 28 by means of the tension of the tension coil spring 33, the engaging step portion 31c engages with the pivotal support pin 32 as shown in FIG. 7 and is in a locked state, and the locked state is kept.

Figure 8:
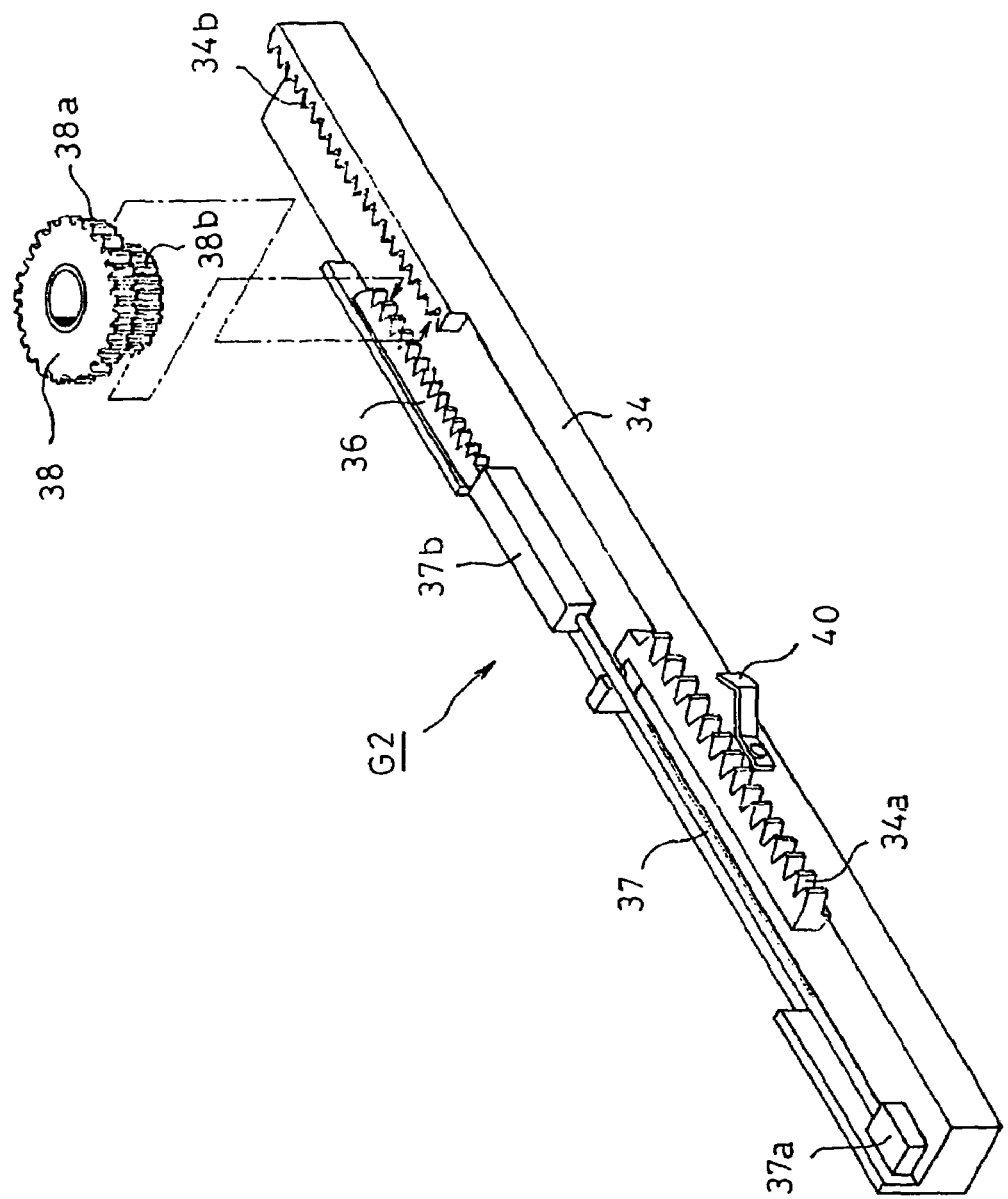
FIG. 8 is a perspective view illustrating a configuration of a rack gear unit.

Next, in the rack gear unit G2, as shown in FIG. 8, gear trains 34a and 34b are integrally formed in a rack main body 34, and the gear train 34a engages with the small-diameter gear of the double gear 25 in the loading gear unit G1. As a result, the rack main body 34 is moved forwardly and backwardly in the chassis case 2 by means of the driving of the loading motor 21. Thus, by moving forwardly and backwardly the rack main body 34, the link mechanism 19 connected to the front end of the rack main body 34 is driven, so that the ejecting lever 17 is moved. Furthermore, as shown in FIG. 2, the guide lever 18 is moved by means of a lever member 35 connected to the rack main body 34 on a surface of the base panel 6. When the link mechanism 19 is driven, the frame member 8 is moved up and down in synchronism with the driving of the link mechanism, so that the clamp head 7 clamps the optical disk or releases the clamped optical disk.

On the rack main body 34 thus constructed, the gear member 36, which is moved forwardly and backwardly at the front end of the rack main body, is arranged in a floating state, and a push-pin 37 having blocks 37a and 37b in the front and the rear thereof to push and advance the gear member 36 is arranged. The gear train 34b and the gear member 36 are coupled to each other to engage with a double gear 38 rotatably provided on a gear frame 39. In this case, the large-diameter gear 38a of the double gear 38 engages with the rear end of the gear train 34b, and the small-diameter gear 38b engages with the front end of the gear member 36 integrally formed together with the block 37b.

As a result, since the double gear 38 is rotated at a prescribed position when the gear member 36 is advanced by means of external force through the push-pin 37, the rotary power of the large-diameter gear 38a is transferred to the gear train 34b, so that the rack main body 34 is moved backwardly. Reference numeral 40 denotes an operational piece for pushing the reset piece 31g formed at the front end portion of the slider member 31 of the aforementioned loading gear unit G1. In a case where the loading gear unit G1 is in the state shown in FIG. 7, when the operational piece 40 pushes the reset piece 31g of the slider member 31, the engagement of the pivotal support pin 32 and the engaging step portion 31c is released, so that it returns to the state shown in FIG. 6.

The important portions of the present invention are constructed as described above, and in this construction, a procedure for use when the optical disk D is forcibly ejected will be now described. The ejection of the optical disk D is carried out, as described above, by moving the ejecting lever 17. However, since the ejecting lever 17 is moved by means of the backward movement of the rack main body 34, the ejection of the optical disk can be carried out only in a state where the emergency pin P is inserted through the through hole 3c of the bezel 3.

Figure 9:
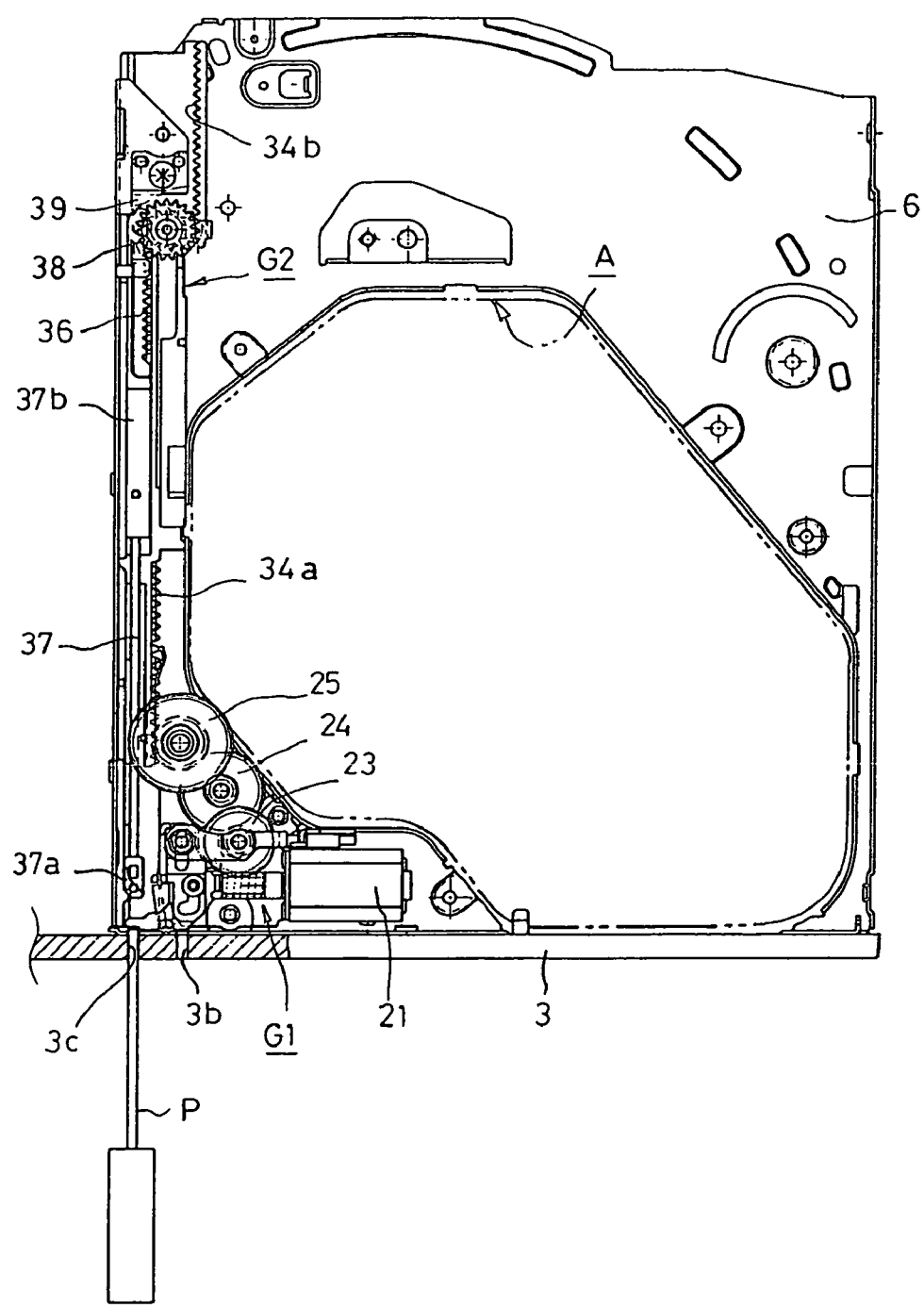
FIG. 9 is a diagram illustrating emergency manipulation.

When the slider member 31 of the loading gear unit G1 is in the normal state position, as shown in FIG. 9, the closing projection 31e closes the through hole 3c, so that the manipulation is protected. As a result, since the rack main body 34 cannot be manipulated in the above state, the optical disk D cannot be unloaded even if the emergency pin P is inserted, regardless of recognition of a user who wants to unload the optical disk D.

Figure 10:
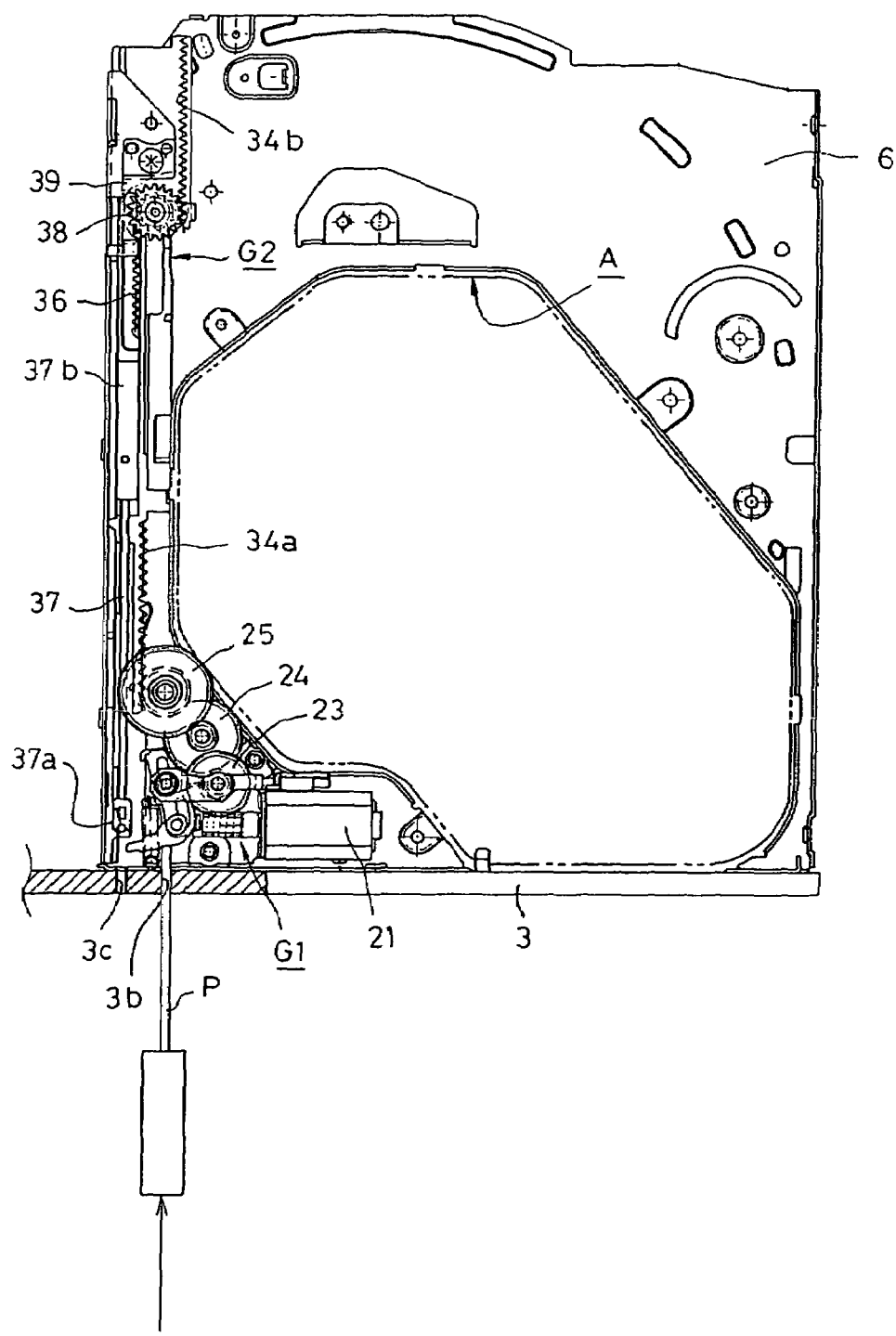
FIG. 10 is a diagram illustrating emergency manipulation.

On the other hand, in a case of manipulation on the basis of a clear recognition of unloading the optical disk D, as shown in FIG. 10, the emergency pin P is inserted into the through hole 3b of the bezel 3, so that the loading gear unit G1 pushes the slider member 31. As a result, the slider member 31 is slanted aside, and thus the closed state of the through hole 3c by the closing projection 31e is released. At this time, since the slant surface 31b of the slider member 31 pushes the end portion 27a of the holder 27 from the bottom surface, the engagement of the worm gear 22 and the double gear 23 is released, so that the double gears 23, 24 and 25 can be rotated freely. At this time, when the spindle motor 11 drives and rotates the optical disk, the dog head 27b of the holder 27 stops the spindle motor 11 by driving the knob 30a to turn on the limit switch 30.

Figure 4:
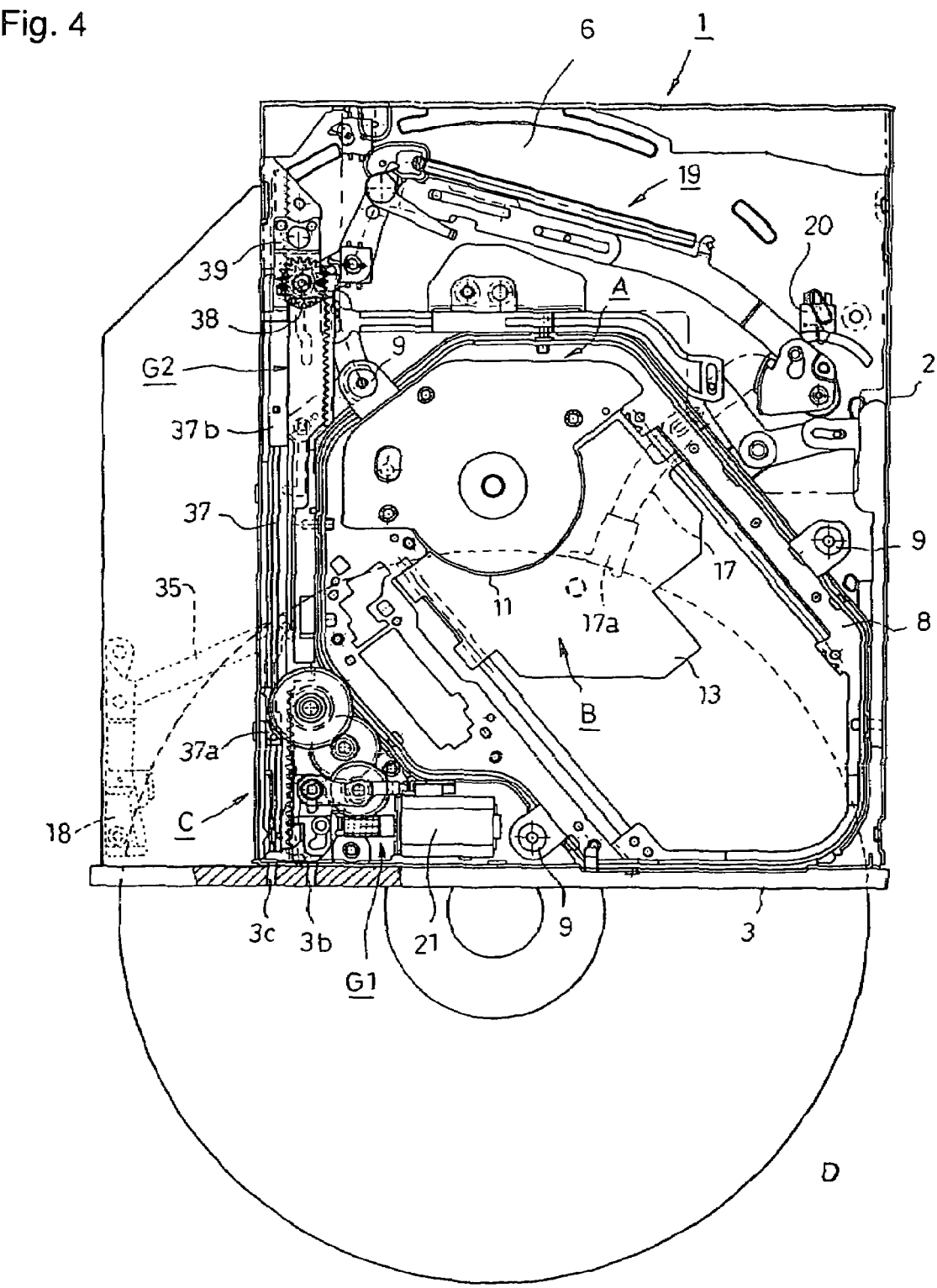
FIG. 4 is a diagram illustrating an inner configuration on the bottom surface of the disk apparatus shown in FIG. 1.
Figure 11:
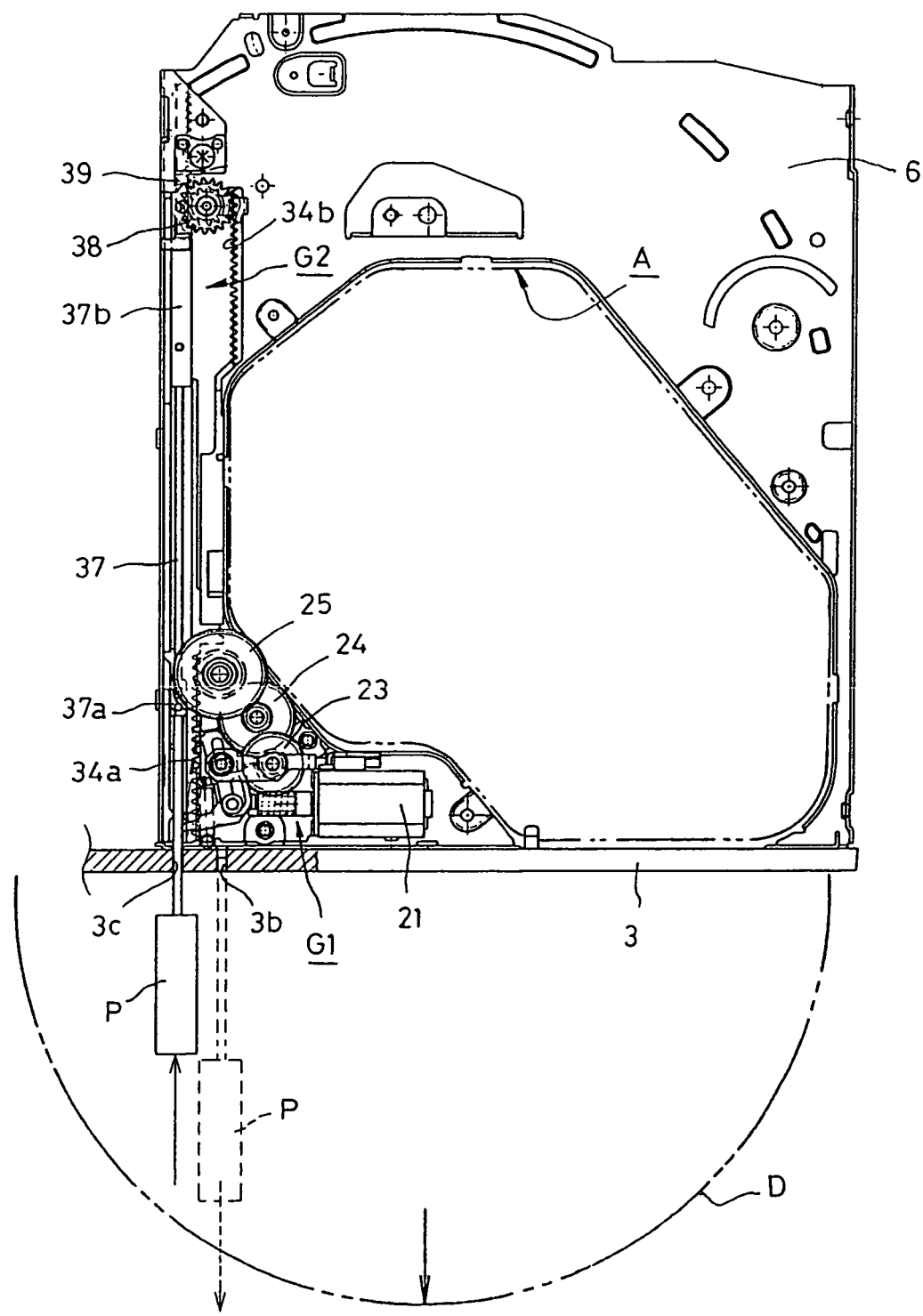
FIG. 11 is a diagram illustrating emergency manipulation.

After the manipulation through the through hole 3b is completed thus, the emergency pin P pulled out from the through hole 3b is inserted into the through hole 3c, and then pushed, whereby the rack main body 34 is moved backwardly with advancement of the gear member 36, as shown in FIG. 11. As a result, the ejecting lever 17 is moved, so that the optical disk D can be unloaded as shown in FIGS. 11 and 4.

Figure 12:
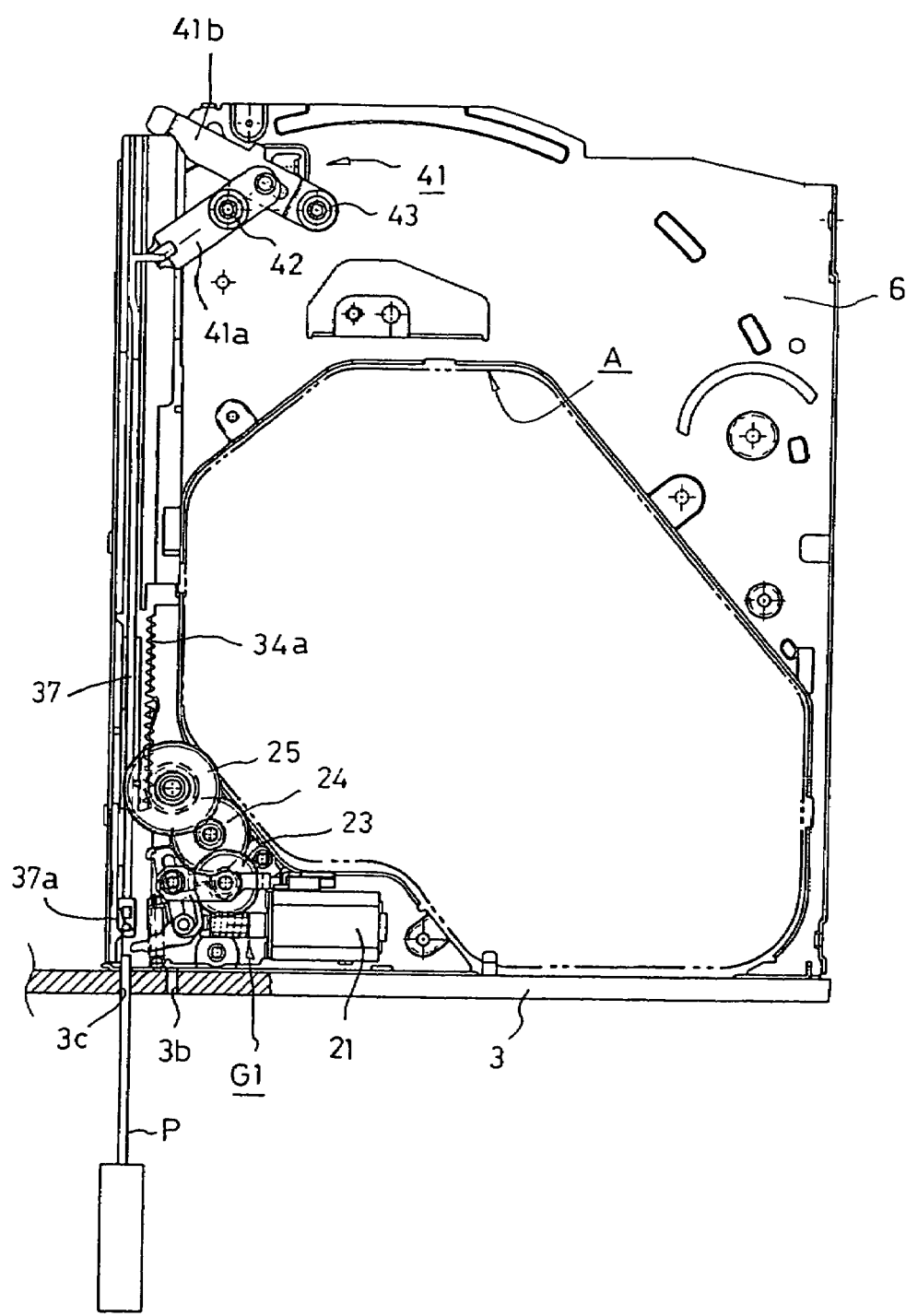
FIG. 12 is a diagram illustrating another example of an operating mechanism of the rack gear unit.
Figure 13:
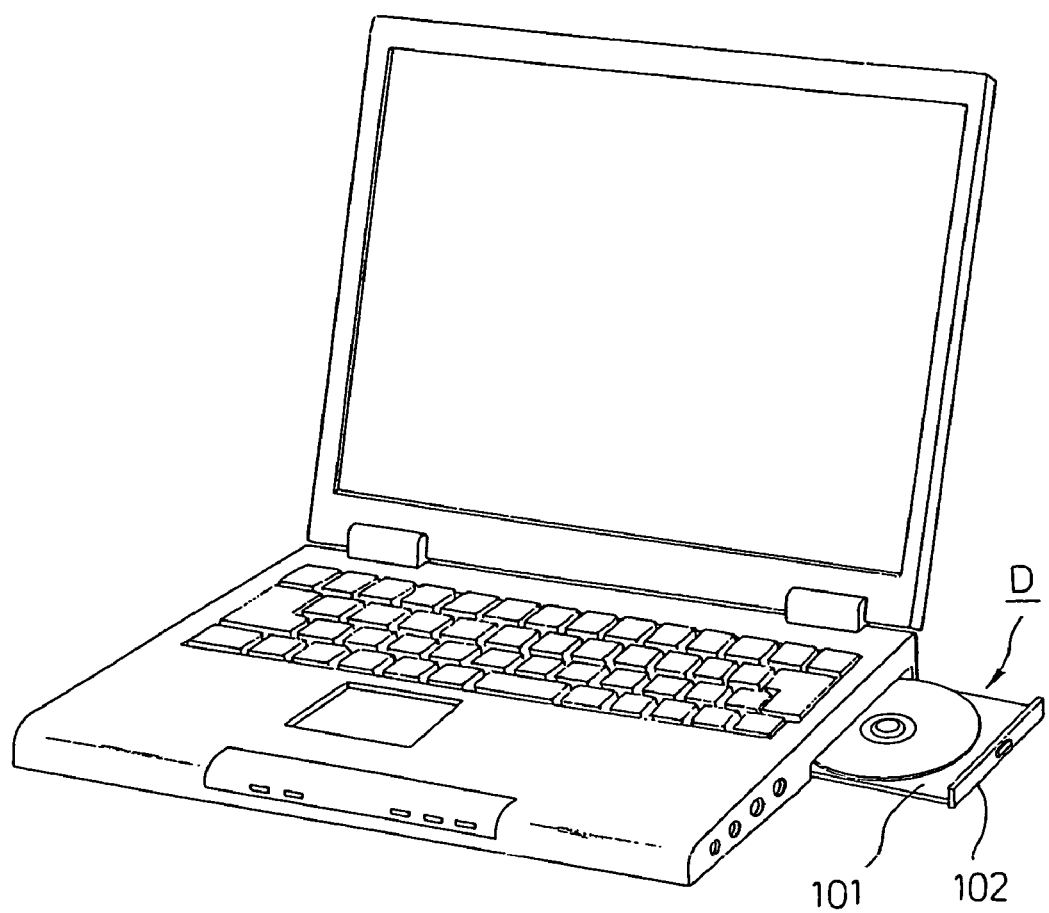
FIG. 13 is a perspective view illustrating an appearance of a notebook PC.
Figure 14:
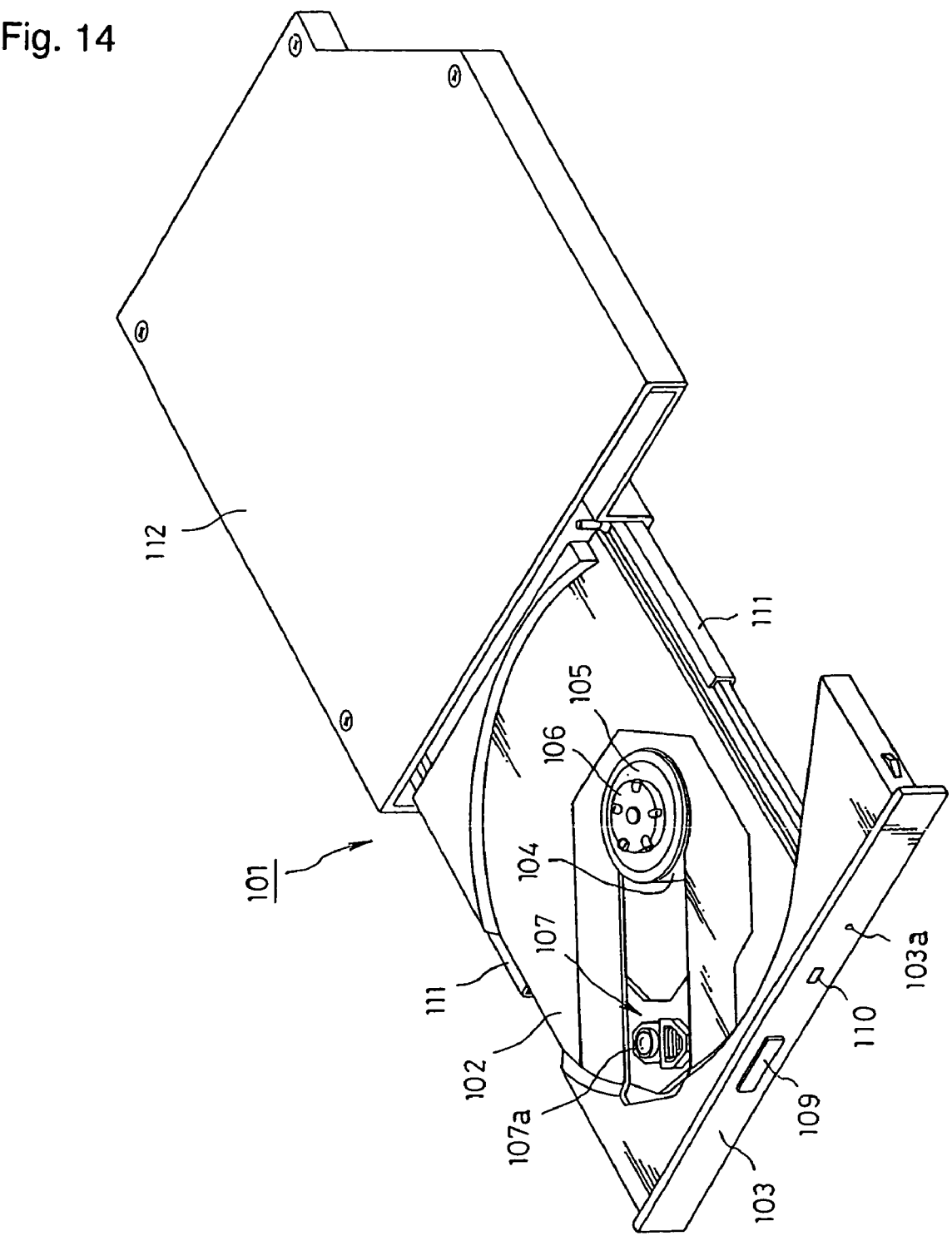
FIG. 14 is a perspective view illustrating an appearance of a conventional disk apparatus.
Figure 15:
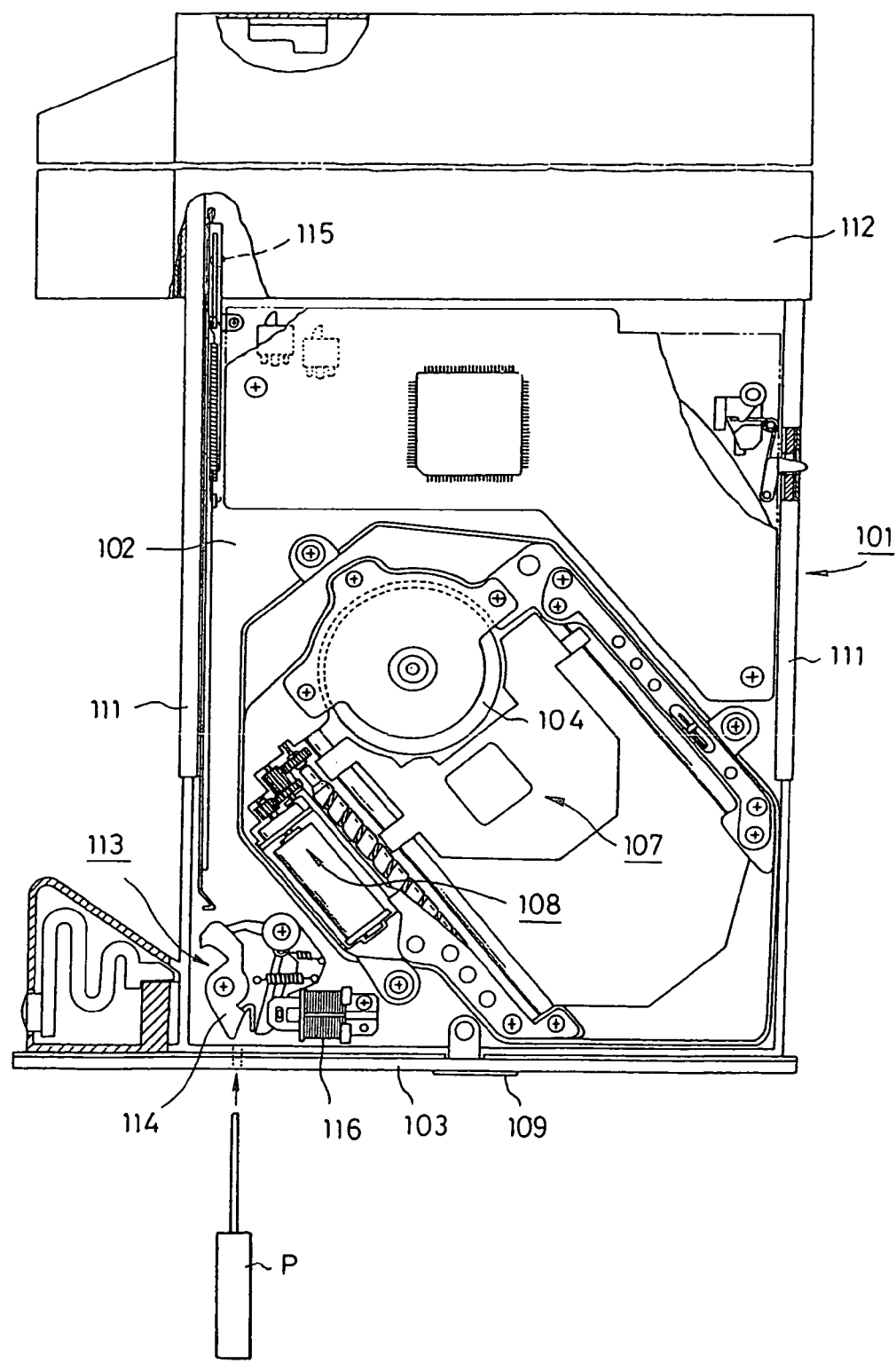
FIG. 15 is a diagram illustrating an inner configuration on the bottom surface of the conventional disk apparatus.

FIG. 12 is a diagram illustrating another example of an operational mechanism for the rack gear unit G2. Here, when the front end of the push-pin 37 is connected to a link arm 41a of the link mechanism 41 and the link arm 41a is pushed and rotated about a support axis 42, a link arm 41b is moved counterclockwise about a support axis 43. As a result, the front end of the link arm 41b pushes an end portion of the rack main body 34, and thus the rack main body 34 is moved forwardly, so that the same function as described above can be accomplished.

As described above in detail, according to the first aspect of the present invention, since the first release means and the second release means are provided, it is possible to give a clear recognition to a user in unloading the optical disk. Therefore, it is possible to prevent erroneous manipulation due to arbitrary or vague recognition. Further, a system capable of enforcing a clear recognition of unloading the optical disk by a user can be implemented, so that it is possible to improve safety in recording data, etc.

According to the second aspect of the present invention, since rotation of the optical disk is stopped, and then the optical disk is unloaded by means of the manipulation of the first release means, it is possible to prevent damage on the optical disk.

According to the third and fourth aspects of the present invention, since the loading gear unit and the rack gear unit for loading and unloading the optical disk constitute the first release means and the second release means, the number of mechanism elements can be kept to a minimum, so that it is possible to suppress an increase in manufacturing cost.

According to the fifth aspect of the present invention, since the rotation of the optical disk is stopped, and then the optical disk is forcibly unloaded from the case, it is possible to safely and accurately unload the optical disk from the case by means of stepwise manipulation.

What is claimed is:

1. A disk apparatus for loading and driving an optical disk, and for recording or reproduction of data on the optical disk, the disk apparatus comprising:

a first emergency through hole and a second emergency through hole, each provided in an apparatus casing, first release means and second release means for externally manipulating a mechanism for unloading a loaded optical disk, respectively, through the first emergency through hole and the second emergency through hole, wherein manipulation of the second release means forcibly unloads the loaded optical disk only after manipulation of the first release means.

2. The disk apparatus according to claim 1, wherein the driving of a spindle motor for rotating the optical disk is stopped by the manipulation of the first release means.

3. A slot-in type disk apparatus for loading and driving an optical disk, and for recording or reproduction of data on the optical disk, the disk apparatus comprising:

a loading gear unit for loading and unloading the optical disk;

a rack gear unit for interlocking with the loading gear unit and having a manipulation-protected state preventing unloading of the optical disk;

a first emergency through hole and a second emergency through hole, each provided in an apparatus casing, first release means for the loading gear unit being manipulatable externally through the first emergency through hole and causing release of the manipulation-protected state; and second release means for the rack gear unit being manipulatable externally through the second emergency through hole and causing optical disk unloading in the absence of the manipulation-protected state, wherein the manipulation-protected state of the rack gear unit is released by manipulation of the first release means for the loading gear unit.

4. The disk apparatus according to claim 3, wherein the rack gear unit switches to a floating state to enable the unloading manipulation of the optical disk by manipulation of the first release means of the loading gear unit.

5. A disk apparatus for loading and driving an optical disk, and for recording or reproduction of data on the optical disk, wherein the disk apparatus comprising:

first release means and second release means for externally manipulating, respectively, through a first emergency through hole and through a second emergency through hole provided in an apparatus casing; and an emergency unloading mechanism for stopping driving of a spindle motor for rotating the optical disk by manipulation of the first release means, and for unloading forcibly a loaded optical disk by manipulation of the second release means only after said manipulation of the first release means.

* * * * *